A. E. STIGBERG.
TYPE CARRIER.
APPLICATION FILED MAY 27, 1913.
1,102,104.
Patented June 30, 1914.
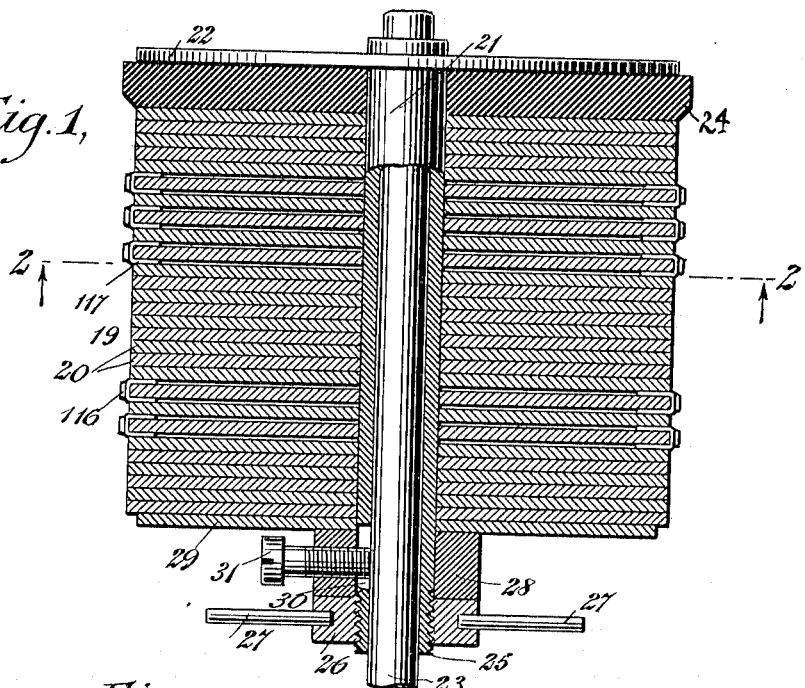
Fig.1.
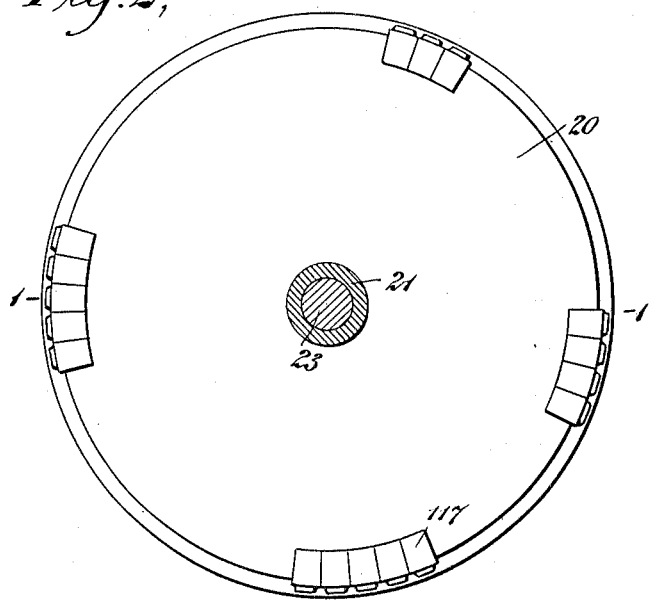
Fig.2.
Fig.3.
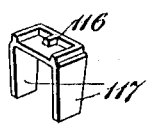
WITNESSES
Edw. Thorpe
B. Joffe
INVENTOR
Axel E. Stigberg
BY
Munn & Co.
ATTORNEYS

UNITED STATES PATENT OFFICE.

AXEL EDMUND STIGBERG, OF NEW YORK, N. Y.

TYPE-CARRIER.

1,102,104.   Specification of Letters Patent.   Patented June 30, 1914.

Application filed May 27, 1913. Serial No. 770,106.

*To all whom it may concern:*

Be it known that I, AXEL E. STIGBERG, a citizen of the United States, and a resident of the city of New York, borough of Brooklyn, in the county of Kings and State of New York, have invented a new and Improved Type-Carrier, of which the following is a full, clear, and exact description.

The object of the invention is to provide a type carrier on which different sizes of type can be easily and quickly set and adjusted and whereby the printed matter may be made to appear in straight or sinuous lines and in any desired relation to the border of the object on which the matter is to be printed.

The invention consists of the construction and combination of parts to be more fully described hereinafter and fully set forth in the claims.

Reference is to be had to the accompanying drawings forming a part of this specification, in which like characters indicate corresponding parts in all the views and in which:

Figure 1 is a horizontal section on line 1—1 of a type carrier embodying my invention; Fig. 2 is a section on line 2—2, Fig. 1; and Fig. 3 is a perspective view of type used in connection with my type carrier.

Referring to the drawings, the type carrier is in the form of a cylinder 19 formed of a plurality of disks 20, preferably of the same thickness and of material such as fiber. It is understood that other materials can be used for the same purpose. The disks 20 are provided with a circular opening and are mounted on a tubular member 21 fitting snugly into the central opening of the disk. A flange or disk 22 is, preferably, integrally formed at one end of said tubular member. A rubber disk 24 is mounted on the tubular member 21 intermediate the disk 22 and the disks 20, the diameter of said disk 24 being slightly greater than the diameter of the disk 20, and whereby said rubber disk forms a frictional member for transmitting a rotary motion from the cylinder 19..

The opposite end 25 of the tubular member 21 is threaded and receives a nut 26 provided with arms 27, by means of which the nut is operated. Mounted on the member 21 adjacent the end 26 is a collar 28, which bears against the flange or disk 29 engaging the adjacent disk 20. The tubular member 21 under the collar 28 is provided with a slot 30 which is engaged by a screw 31 positioned in the collar. By means of the nut 26, the collar 28, with the flange 29, disks 20 and rubber disk 24 are forced against the disk 22, which is integral with the member 21, and whereby all the disks form a compact cylinder.

A shaft 23 is mounted to rotate in the tubular member 21; and by means of the screw 31 the collar 28 is secured to the shaft 23; and as the screw engages the slot 30 of the tubular member 21, the same will rotate when the shaft 23 is rotated, and, therefore, everything mounted on the member 21 will rotate with it.

The type 116 used in connection with the type carrier is provided with extensions 117 substantially perpendicular to the plane on which the type is formed. These extensions 117 are adapted to fit between the disks 20 of the cylinder 19. The letters can be formed so as to extend perpendicularly to the plane of the extensions 117 or parallel to the same, that is, the letters may be formed at right angles to what is shown in Fig. 3 with the extensions remaining in the same plane. The distance between the extensions 117 can be made greater or less, that is, it may be equal to the thickness of one disk 20, or more; and, if desired, the type formed can extend the entire length of the cylinder or part of the same. It is understood that when the type extends over a large part of the cylindrical surface, the same conforms to the curvature of the cylindrical surface on which it appears. The type is preferably pressed from very thin brass sheets, so that the same can easily bend to the curvature of the cylindrical surface on which it is set. The extensions 117 are sufficiently long so that when the disks 20 are compressed by means of the nut 26, the type is held firmly in place on the cylindrical surface.

Having thus described my invention, I claim as new and desire to secure by Letters Patent:

1. In a type carrier, a shaft; a tubular member on said shaft having a flange at one end thereof; a resilient disk on said tubular member adjacent the said flange; a plurality of disks on said tubular member; means on the tubular member whereby said last mentioned disks are forced against said resilient disk and the flange; and means for securing said tubular member to said shaft.

2. In a type carrier, a shaft; a tubular member on the shaft; a flange at one end of the tubular member rigid with the same; a rubber disk on said tubular member contacting with said flange; a plurality of disks of substantially equal thickness on said tubular member; means on the tubular member whereby said last mentioned disks are forced against the said rubber disk and said flange; and means for securing said tubular member to said shaft whereby all of said disks are secured to the shaft.

3. In a type carrier, a shaft; a tubular member on the shaft having a threaded end and a flange at the opposite end; a resilient disk on the tubular member engaging the flange; a nut on the threaded end of the tubular member; a flange collar adjacent the nut and the tubular member; a plurality of disks on said tubular member intermediate the resilient disk and the flange collar, said tubular member adjacent the threaded end having a slot; and a screw in the flange collar passing through the slot and adapted to engage the said shaft.

4. In a type carrier, a shaft; a tubular member on the shaft having a threaded end and a flange at the opposite end thereof; a rubber disk on the tubular member engaging the flange; a nut on the threaded end of the tubular member; a flange collar adjacent the end of the tubular member; a plurality of disks on said tubular member intermediate the rubber disk and the flange collar; means on the flange collar adapted to secure the same to the shaft, said tubular member having means therein engaged by said means on said flange collar whereby said tubular member is caused to rotate when said flange collar is rotated by said shaft.

In testimony whereof I have signed my name to this specification in the presence of two subscribing witnesses.

AXEL EDMUND STIGBERG.

Witnesses:
   Oscar W. F. Gathberg,
   Thos. T. Sweeney.

---

Copies of this patent may be obtained for five cents each, by addressing the "Commissioner of Patents, Washington, D. C."